United States Patent
Read

[11] 3,897,895
[45] Aug. 5, 1975

[54] SKI CARRIERS

[75] Inventor: Clifford D. Read, Toronto, Canada

[73] Assignee: A. L. & W. Limited, Bramalea, Canada

[22] Filed: Mar. 21, 1974

[21] Appl. No.: 453,209

[52] U.S. Cl..... 224/42.1 B; 224/42.1 F; 211/60 SK; 248/316 R; 280/11.37 K
[51] Int. Cl............................................. B60r 9/04
[58] Field of Search...... 224/42.1 F, 42.1 E, 42.1 D, 224/42.1 R, 42.1 G, 42.1 H, 42.1 B, 42.1 C, 29 R; 280/11.37 K; 198/179, 180; 24/81 SK, 81 CC; 211/60 SK, 60 R, 60 A, 60 T, 60 G, 41; 248/316 D, 316 B, 68 R

[56] References Cited
UNITED STATES PATENTS

| | | | |
|---|---|---|---|
| 2,639,081 | 5/1953 | Metzger | 211/60 A |
| 2,881,911 | 4/1959 | Krill | 206/330 |
| 2,953,240 | 9/1970 | Nigrelli et al. | 198/179 |
| 3,836,058 | 9/1974 | Penniman | 224/42.1 F |

*Primary Examiner*—Robert J. Spar
*Assistant Examiner*—Jerold M. Forsberg

[57] ABSTRACT

In carriers secured to an automobile roof and particularly useful for carrying skis, an elongated flexible strip slides within a guideway of each carrier extending transversely of the roof, the strip having pairs of risers extending upwardly with a gap between each pair of risers within which skis can be clasped. One carrier is mounted on the roof ahead of the other, with the guideways parallel. The strip is at least partially slidable longitudinally out of the guideway whereupon it can be flexed to widen the gap between each pair of risers to allow insertion or removal of skis from between the risers. Means are provided for indicating to a user the optimum flexing point on the strip for each pair of risers. Means are also provided for locking the strip fully inserted within the guideway to prevent removal of skis being held by the risers. When a strip is so locked a cover extending downwardly from the strip blocks access from an end of the guideway to the means securing the carrier to the automobile roof, preventing theft of the carrier.

12 Claims, 5 Drawing Figures

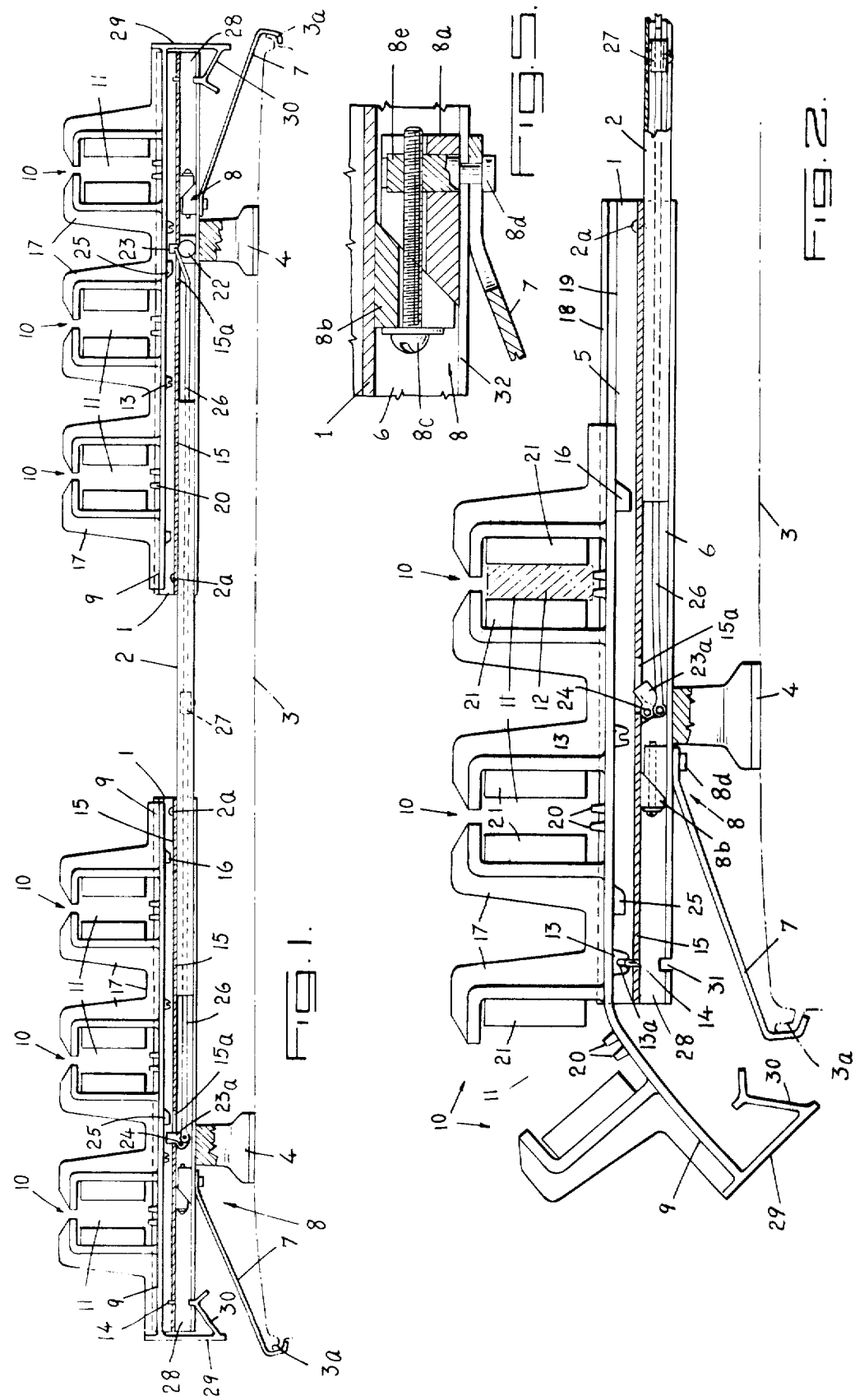

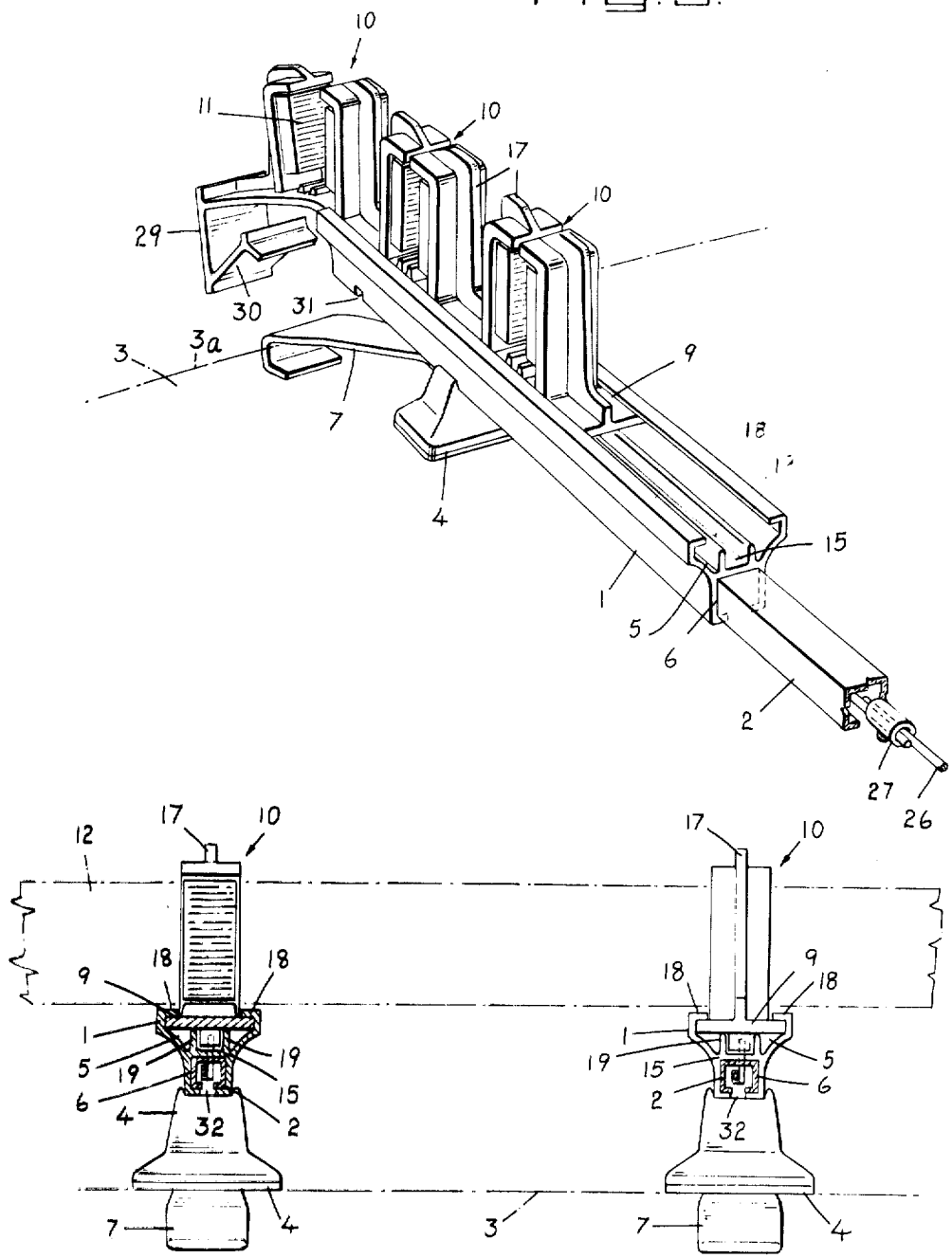

SKI CARRIERS

BACKGROUND OF THE INVENTION

1. Field of the Invention

This invention relates to carriers which are particularly useful for holding skis and are mountable on the roof of an automobile.

2. Description of the Prior Art

Various types of ski carriers for use on automobile roofs have been devised. Commonly, it is necessary, for a person putting skis onto or taking them off of such carriers, to lean against the automobile and reach over the top. This is inconvenient and may result in dirtying of clothing.

SUMMARY OF THE INVENTION

The present invention enables skis to be mounted and removed at the side of an automobile rather than having to lean over the top. This is accomplished by providing elongated flexible strips which slide within guideways extended transversely of an automobile roof. The strips can be pulled out at the side of the automobile and bent to cause risers extending upwardly from them to spread, for insertion or removal of skis.

BRIEF DESCRIPTION OF THE DRAWINGS

In the accompanying drawings which illustrate an embodiment of the invention,

FIG. 1 is a partly sectional front view of a ski carrier secured to an automobile roof shown in broken lines;

FIG. 2 is a fragmentary partly sectional front view of one end of the ski carrier on an enlarged scale with the elongated flexible strip at that end partially withdrawn and flexed to allow insertion of skis between a pair of risers;

FIG. 3 is a fragmentary perspective view of one end of the ski carrier with the elongated flexible strip at that end partially withdrawn as in FIG. 2;

FIG. 4 is a side view of a pair of ski carriers, mounted one ahead of the other to carry skis on an automobile roof, showing in section one of the carriers and showing in broken lines a segment of a ski held by the carriers; and FIG. 5 is an enlarged longitudinal section through adjustable fastening means for holding the carrier to a vehicle roof.

DESCRIPTION OF THE PREFERRED EMBODIMENT

Each carrier illustrated has a pair of elongated guideways 1 (FIG. 1) which are connected together by a connecting channel 2, the guideways extending transversely of an automobile roof 3 while resting on feet 4 fastened to the guideways. The guideways 1, which (as best seen in FIG. 3) have upper channels 5 and lower channels 6, are held to the automobile roof 3 by hold-down strips 7 which are hooked onto the edges 3a on the roof and are connected to the guideways by carrier securing means generally indicated by reference numeral 8 (FIGS. 1 and 2). As shown in FIG. 4, two carriers are mounted on the roof, one ahead of the other, with their guideways 1 parallel.

Each securing means 8 (FIG. 5) has a pair of are described in detail in copending U.S. patent application Ser. No. 448,193 of Ronald W. Parsons filed Mar. 5, 1974. Briefly, each securing means has a pair of wedge members 8a, 8b in the lower channel 6 of one of the guideways 1. The members 8a, 8b can be moved along the channel to a suitable point and then jammed into contact with the bottom and top respectively of the channel.

The jamming is accomplished by screwing a bolt 8c into a cylindrical nut 8e located in a vertical cylindrical hole in wedge member 8a. The nut 8e has a headed extension 8d which extends through a slot 32 (FIGS. 4 and 5) running the length of the guideway 1 in the bottom of lower channel 6, and hold-down strip 7 can be connected to the extension.

To determine the point at which each securing means 8 should be fixed along the channel 6, the members 8a, 8b are slid inwardly toward the centre of the automobile roof 3 until the hold-down strip 7 is pulled tightly against the roof edge 3a. The bolt 8c, which passes through longitudinal vertical grooves in the wedge members, is then screwed into the nut 8e and forces the wedge members 8a, 8b to move downwardly and upwardly to become fixed at that point within the lower channel 6.

The extension 8d is an integral part of the nut 8e so that it is not possible to undo the securing means 8 from the bottom of the guideway 1. The securing means 8 can only be undone by inserting a screwdriver through an end 28 of the lower channel 6 where there is access to the bolt head 8c for loosening of the bolt.

Within the upper channels 5 of the guideways 1 are elongated flexible strips 9 (FIG. 2), preferably of high density polyethylene, which are slidable longitudinally of the guideways.

Three pairs of risers, indicated generally by numeral 10, are fast with and extend upwardly from the strips 9, with gaps 11 between them (FIG. 2) in which skis 12 (FIGS. 2 and 4) can be clasped. The strips 9 are slidable out of the guideways 1 whereupon they can be flexed to widen the gaps 11 as shown in FIGS. 2 and 3. This allows skis 12 to be removed or inserted between the risers 10.

To indicate to a user the optimum position for flexing a strip 9 to widen one of the gaps 11, indicating means are provided, such means being constituted by flexible projections 13 (FIG. 2) on the strips extending downwardly into the upper channels 5 of the guideways 1, each projection 13 having an upwardly extending notch 13a adapted to receive, as the strip is pulled out of or pushed into the guideway, a catch 14 (FIG. 2) preferably consisting of a pin fixed to the divider 15 between the upper channel 5 and lower channel 6 of the guideway, the catch extending upwardly into the upper channel 5. When a user pulls the strip 9 outwardly or pushes it inwardly he can feel a yieldable resistance to movement of the strip 9 in the upper channels 5 of the guideway 1, this resistance being caused by a projection 13 encountering the catch 14 and snapping over it, as shown at the left-hand end of FIG. 2, and this indicates the position at which the strip 9 is best flexed to obtain a wide opening of a gap 11 so as to remove or insert a ski 12. At the inner end of each strip 9 is a solid stop 16 (FIGS. 1 and 2) extending downwardly into the upper channel 5 of guideway 1, and as the strip is pulled outwardly this stop will engage the catch 14 to prevent the strip from being pulled totally out of the guideway. The pin 14 is inserted into the divider 15 after the strip 9 has been inserted into the guideway.

Longitudinal ribs 17 run lengthwise of the strips 9 and extend upwardly along outer surfaces of the risers 10. These ribs stiffen the strip 9 at the ends and between the risers and also impart rigidity to the risers for gripping the skis 12. Flanges 18 and 19 (FIGS. 3 and 4) of the upper channel 5 locate the strips 9 within the guideways restrict bending of the strips when in the guideways. The upright flanges 19 elevate the strips 9 in the guideways, and although the strips appear from the drawings to be rather snug in the guideways there is clearance between the strips and the flanges 18 as well as between the strips and the sides of the guideways so that water can drain away to prevent buildup of ice. The strips are strengthened transversely by ribs 20 at the bottom of the gaps 11, and the ribs 20 provide bearing surfaces for the skis.

The risers 10 are hooked inwardly at their upper ends and are able to encompass the skis 12, thereby preventing removal of the skis when the strips 9 are in the guideways and cannot be flexed downwardly. The inner surfaces of the risers 10 which clasp the skis 12 have resilient tubular pads 12 which can deform to grip, without scratching, ski parts of variable dimensions.

A lock 22 (indicated at the right-hand end of FIG. 1) is provided for locking the strips when fully inserted into the guideways 1. The locked position is shown in FIG. 1 and the unlocked position in FIG. 2. In the locked position, the lock 22 has been rotated clockwise as viewed at the right-hand end of FIG. 1, and a catch or dog 23 of the lock extends upwardly through a slot 15a in the divider 15, to obstruct the upper channel 5. A stop 25 extending downwardly from the adjacent strip 9 will engage the catch 23 and prevent outward movement of the strip unless the lock is operated, preferably by a key, to swing the catch 23 downwardly (counterclockwise). A linkage, consisting of a pair of connecting rods 26, connects the catch 23 to a pivoted catch 23a at the left-hand end of the carrier, and in the locked position catch 23a is swung upwardly (FIG. 1) to block a stop 25 on the adjacent strip 9, but in the unlocked position at the catch 23a is swung down (FIG. 2) about its pivot 24, out of the way of the strip. The rods 26 extend lengthwise along the lower channel 6 of the guideways and are joined together by a collar 27 in the connecting channel 2. The connecting channel joins the guideways 1 by sliding into the lower channels 6 of the guideways, being fastened by set screws 2a that are accessible only when the strips 9 are pulled partly out of the guideways. The lock 22 is preferably located at the driver's side of the car, so that the driver can conveniently unlock and lock both strips from his side. The length of the carrier can be adjusted by loosening the set screws 2a and sliding the guideways 1 relative to the channel 2.

As noted above the carrier securing means 8 are accessible only from the ends 28 (FIG. 2) of the lower channels 6 of the guideways 1. To prevent access to these securing means, and thus to prevent removal of the carrier from the top of an automobile, the strips 9 are provided with integral covers 29 (FIGS. 1 and 2) at their ends which extend downwardly from the strips and block access to the securing means whenever the strips are held fully inserted in the guideways 1 by the catches 23, 23a. Flexible tongues 30 extend from the ends of the covers and can fix the covers 29 to the guideways 1, whenever the strips 9 are held fully inserted, by snapping into slots 31 in the bottom of the guideways.

With skis held between the sets of risers 10 the strips 9 may offer resistance to being pulled out, particularly if frost has accumulated on the carrier, and it may be advantageous to provide upstanding handles at the outer ends of the strips 9 to facilitate pulling the strips outwardly. Other modifications of the embodiment described will occur to those skilled in the art and are intended to be covered by the following claims.

What is claim is:

1. A pair of carriers for mounting on the roof of an automobile each carrier comprising an elongated guideway, an elongated flexible strip having ends, said strips being slidable longitudinally of the guideway, at least one pair of risers fast with and extending upwardly from the strip with a gap between them in which a load can be clasped by the risers, the strip being at least partially slidable longitudinally out of the guideway whereupon the strip can be flexed to widen said gap and allow a load to be removed or inserted between the risers, means for holding the strip substantially fully inserted in the guideway, and means for releasably mounting the guideways of said pair of carriers parallel to each other and transversely of the automobile on the roof.

2. Carriers as in claim 1 each including means for indicating to a user the optimum position for flexing the strip to widen said gap.

3. Carriers as in claim 2 wherein said indicating means includes a flexible projection on the elongated flexible strip, the projection having a notch adapted to receive a catch fixed to the guideway, there being yieldable resistance to movement of the strip in the guideway when the catch is in the notch.

4. Carriers as in claim 1, each including ribbing on the risers and elongated flexible strip to impart rigidity thereto save at the gap between the risers.

5. Carriers as in claim 4 wherein said ribbing comprises a longitudinal rib running lengthwise of the elongated flexible strip and extending upwardly along outer surfaces of the risers.

6. Carriers as in claim 5 wherein the risers are hooked inwardly at their upper ends to permit a load to be substantially encompassed by the risers.

7. Carriers as in claim 6 wherein the risers have padded load-clasping surfaces.

8. Carriers as in claim 1 wherein said holding means includes a lock, a dog which can be moved by the lock and a stop projecting from the elongated flexible strip, the dog being movable to a position where it prevents sliding of the strip out of the guideway by blocking movement of the stop.

9. Carriers as in claim 8 each having at either end one of said guideways and one of said elongated flexible strips slidable in the guideway, and wherein said holding means comprises a linkage through which a pair of dogs are connected and through which the said dogs can be simultaneously moved by the lock to prevent sliding of the strips out of the guideways.

10. Carriers as in claim 1 wherein a securing means is located in each guideway and is accessible from an end thereof, a cover extending downwardly from the elongated flexible strip blocking the said access when the strip is held substantially fully inserted in the guideway by said holding means.

11. Carriers as in claim 10 wherein said cover has a flexible tongue extending from its end, the tongue being adapted to snap into a slot in the bottom of the guideway to fix the cover to the guideway.

12. Carriers as in claim 1 including means for adjusting each carrier to different sizes of automobile roofs, said adjusting means being obstructed when the strip is substantially fully inserted in the guideway.

\* \* \* \* \*